United States Patent
Hayashi et al.

(10) Patent No.: US 7,588,844 B2
(45) Date of Patent: Sep. 15, 2009

(54) METHOD OF STARTING UP OPERATION OF FUEL CELL AT LOW TEMPERATURE

(75) Inventors: Katsumi Hayashi, Utsunomiya (JP); Shigeru Inai, Shioya-gun (JP); Hideo Kato, Utsunomiya (JP); Ryo Jimba, Wako (JP); Masahiro Mohri, Utsunomiya (JP); Hiroshi Morikawa, Wako (JP); Hiromichi Yoshida, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 108 days.

(21) Appl. No.: 10/887,709

(22) Filed: Jul. 9, 2004

(65) Prior Publication Data

US 2005/0053809 A1 Mar. 10, 2005

(30) Foreign Application Priority Data

Jul. 9, 2003 (JP) .............................. 2003-272306

(51) Int. Cl.
*H01M 8/04* (2006.01)
(52) U.S. Cl. .............................. 429/13; 429/12; 429/24; 429/26
(58) Field of Classification Search .................. 429/12, 429/13, 24, 26
See application file for complete search history.

(56) References Cited

U.S. PATENT DOCUMENTS 5,798,186 A * 8/1998 Fletcher et al. ............... 429/13
6,358,638 B1 * 3/2002 Rock et al. ..................... 429/13

FOREIGN PATENT DOCUMENTS

| DE | 60005836 T2 | 5/2004 |
|---|---|---|
| JP | 06260199 | 9/1994 |
| JP | 2000106206 A | 4/2000 |
| JP | 2000-512068 A1 | 9/2000 |
| JP | 2002-093445 | 3/2002 |
| JP | 2002134150 A | 5/2002 |
| JP | 2002-343397 | 11/2002 |

* cited by examiner

*Primary Examiner*—Jane Rhee
(74) *Attorney, Agent, or Firm*—Lahive & Cockfield, LLP; Anthony A. Laurentano

(57) ABSTRACT

When it is detected that the temperature of the fuel cell stack is at the freezing temperature of water or less (step S1), an operation mode using a freezing temperature starting up operation control map is selected (step S2). Freezing temperature starting up operation of the fuel cell stack is performed according to the freezing temperature starting up operation control map (step S3). Then, when it is detected that the temperature of the fuel cell stack exceeds the freezing temperature (step S4), the operation mode using the freezing temperature starting up operation control map is switched to an operation mode using a normal starting up operation control map (step S5). Thus, normal starting up operation is performed according to the normal starting up control map (step S6).

7 Claims, 7 Drawing Sheets

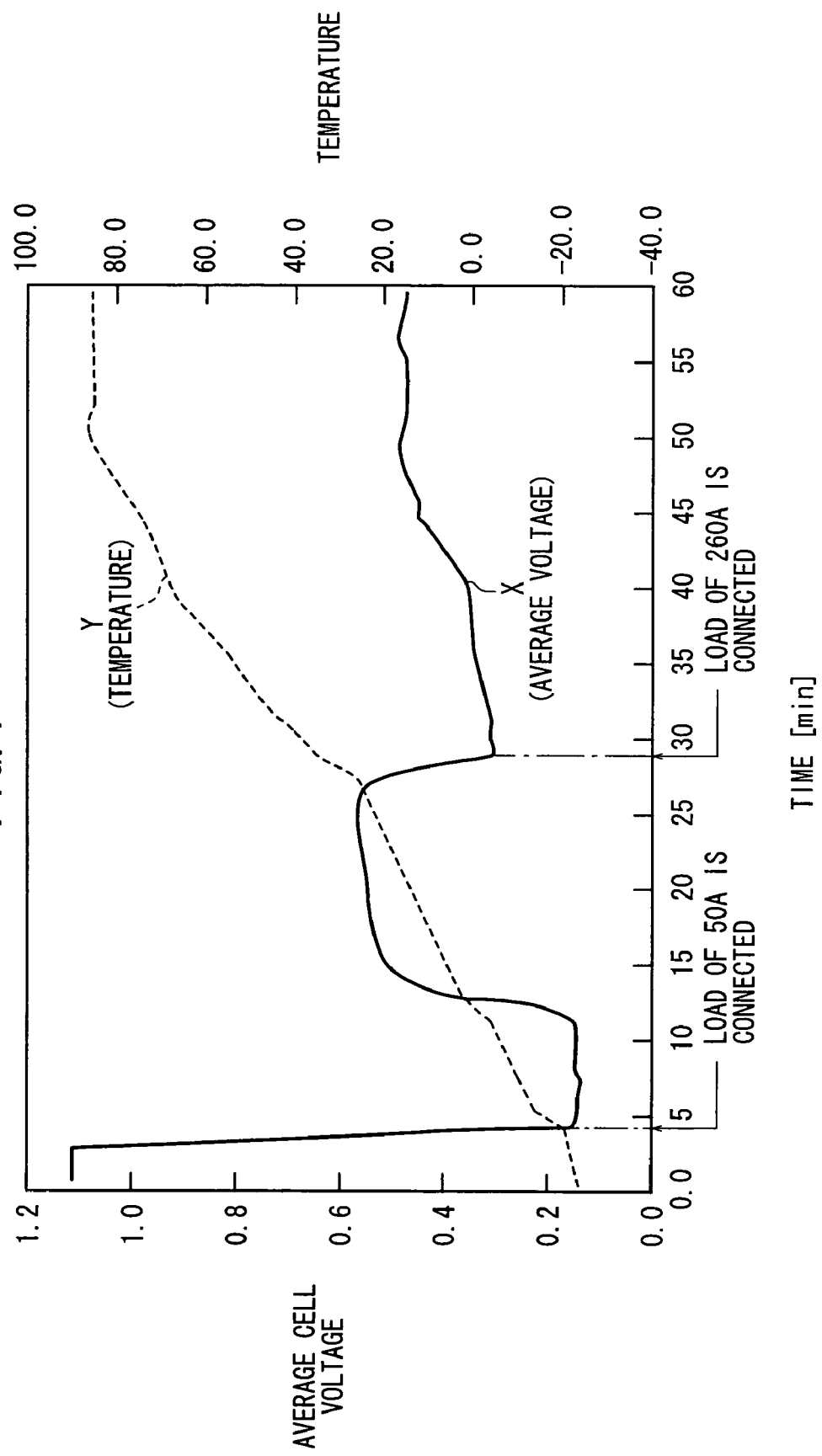

METHOD OF STARTING UP OPERATION OF FUEL CELL AT LOW TEMPERATURE

BACKGROUND OF THE INVENTION

1. Field of the Invention

The present invention relates to a method of starting up operation of a fuel cell at a low temperature at the freezing temperature of water or less. The fuel cell includes an electrolyte electrode assembly and separators sandwiching the electrolyte electrode assembly. The electrolyte electrode assembly includes a pair of electrodes and an electrolyte interposed between the electrodes.

2. Description of the Related Art

Generally, a solid polymer fuel cell employs a membrane electrode assembly (MEA) which includes an anode and a cathode), and an electrolyte membrane interposed between the anode and the cathode. The electrolyte membrane is a polymer ion exchange membrane (proton exchange membrane). The membrane electrode assembly and separators sandwiching the membrane electrode assembly make up a unit of a fuel cell for generating electricity. A predetermined number of the fuel cells are stacked together to form a fuel cell stack.

In the fuel cell, a fuel gas such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte membrane, and the electrons flow through an external circuit to the cathode, creating a DC electric current. A gas chiefly containing oxygen or air (oxygen-containing gas) is supplied to the cathode. At the cathode, the hydrogen ions from the anode combine with the electrons and oxygen to produce water.

In the fuel cell, it is required to suitably humidify the electrolyte membrane (polymer ion exchange membrane) to keep the ion conductivity of the electrolyte membrane. At the cathode, water is produced by the chemical reaction. Thus, in starting operation of the fuel cell in the freezing environment, i.e., at the freezing temperature of water or less, it is likely that water in the fuel cell freezes, and electrochemical reaction is not efficiently carried out.

For example, according to the disclosure of Japanese laid-open patent publication No. 2000-512068, electrolyte membranes such as NAFION (registered trademark) of Dupont, and the experimental membrane (product No. XUX 13204.10) of Dow have sufficient ion conductivity to induce an electrochemical reaction in the fuel cell even at the temperature of −20° C.

Japanese laid-open patent publication No. 2000-512068 suggests that these membranes are advantageously used in a method of starting up a power generation apparatus (fuel cell) at a low temperature below the freezing temperature of water. The power generation apparatus includes a fuel cell stack connectable to an external electrical circuit for supplying electricity to the external electrical circuit. The fuel cell stack includes at least one fuel cell. The fuel cell has a membrane electrode assembly including a cathode, an anode, and a water permeable ion-exchange membrane interposed between the cathode and the anode. At least part of the membrane temperature assembly has a temperature below the freezing temperature of water. The method includes a step of supplying electricity from the fuel cell stack to the external circuit such that part of the membrane electrode assembly exceeds the freezing temperature of water.

FIG. 7 shows relationship (plot X) between the voltage of fuel cell stack and the time (minutes), and relationship (plot Y) between the core temperature of the fuel cell stack and the time (minutes) according to the method of Japanese laid-open patent publication No. 2000-512068. The fuel cell stack includes four fuel cells. Operation of the fuel cell stack is started at the core temperature of −23° C.

According to the disclosure of Japanese laid-open patent publication No. 2000-512068, the passage of hydrogen is closed by water or ice, for about four minutes after operation is started. Therefore, hydrogen does not flow sufficiently for the first four minutes. When the fuel cell is connected to a load of 50 ampere four minutes after starting the operation, the fuel cell can output the electrical current of about 45 ampere initially. However, the output current is decreased to about 15 ampere in a short period of 8 seconds due to freezing of water produced during power generation.

As described above, according to the disclosure of Japanese laid-open patent publication No. 2000-512068, it is possible to start operation of the fuel cell below the freezing temperature of water. However, it is difficult to start the desired operation of the fuel cell smoothly due to the ice that is present at the time of starting operation, and the frozen water produced during operation of the fuel cell.

SUMMARY OF THE INVENTION

A general object of the present invention is to provide a method of starting up operation of a fuel cell at a low temperature in which the operation of the fuel cell is started reliably, particularly, in a freezing environment, i.e., the freezing temperature of water or less, and normal operation can be started rapidly and smoothly.

According to the present invention, when it is detected that temperature of the fuel cell is the freezing temperature of water or less, an operation mode using a freezing temperature starting up operation control map is selected. The freezing temperature starting up operation control map includes a pressure control map for controlling pressures of a fuel cell and an oxygen-containing gas supplied to the fuel cell.

Thus, when the operation of the fuel cell is started in the freezing environment, i.e., at the freezing temperature or less, the pressures of the fuel gas and the oxygen-containing gas are controlled according to the dedicated control map. Then, when it is detected that temperature of the fuel cell exceeds the freezing temperature, switching operation from the operation mode using said freezing temperature starting up operation control map to an operation mode using a normal starting up operation control map is performed.

According to the present invention, gas pressures according to the freezing temperature starting up operation control map are higher than gas pressures according to the normal starting up operation control map.

As shown in FIG. 1, the applicant found that the output current changes depending on the gas pressure at a certain voltage in the freezing environment, and the maximum current can be outputted reliably without any voltage drop. It has been proven that output current increases proportionally as the gas pressure increases.

Further, the applicant found that the gas pressure and the critical load have relationship shown in FIG. 2 at a certain voltage in the freezing environment. It has been proven that when the gas pressure is higher than the gas pressure according to the normal operating condition, the critical load (the maximum output current) reliably outputted from the fuel cell is high.

It is preferable to increase the pressures of the reactant gases supplied to the fuel cell for the following reason. After the fuel cell is started up in the freezing environment, if the water trapped in the electrolyte catalyst layer or the gas diffusion layer freezes, the surface area of the electrodes available for power generation is reduced due to the frozen water, and the gas diffusion characteristics are lowered significantly. Thus, by increasing the pressures of the reactant gases, the reactant gases can be reliably supplied to the power generation surfaces of the electrodes for inducing reactions efficiently. As a result, it is expected that the output current from the fuel cell increases.

The advantage of increasing the pressures of the reactant gases in the freezing environment is larger than the advantage of increasing the pressures of the reactant gases in the normal operating condition.

Further, it is preferable that the freezing temperature starting up operation control map further includes a flow rate control map for controlling at least a flow rate of the oxygen-containing gas supplied to the fuel cell when it is detected that temperature of the fuel cell is a freezing temperature or less.

Furthermore, it is preferable that gas flow rates according to the freezing temperature starting up operation control map are higher than gas flow rates according to the normal starting up operation control map.

Moreover, it is preferable that the oxygen-containing gas is compressed by a compressor, and the compressor is driven by the electricity generated by the fuel cell. Thus, self-heating is accelerated to raise the temperature of the fuel cell rapidly.

It is preferable that the consumed fuel gas discharged from the fuel cell is circulated, and supplied to the fuel cell again. The heat energy of the waste gas (fuel gas) can be used advantageously to raise the temperature of the fuel cell rapidly.

According to the present invention, when it is detected that the temperature of the fuel cell is the freezing temperature of water or less, the pressure control map of the fuel gas and the oxygen-containing gas is switched to use the freezing temperature starting up operation control map. Thus, in the freezing environment, it is possible to rapidly generate electricity for high load, to prevent problems in the fuel cell such as freezing of water, and to warm up the fuel cell rapidly.

When it is detected that the temperature of the fuel cell exceeds the freezing temperature, switching operation from the operation mode using the freezing temperature starting up operation control map to the operation mode using the normal starting up operation control map is performed. Thus, the fuel gas and the oxygen-containing gas are consumed efficiently, and it is possible to start the normal starting up operation of the fuel cell desirably.

The gas pressures according to the freezing temperature starting up operation control map are high. Therefore, even if the catalyst does not function effectively in the freezing environment, and the gas diffusion characteristics are lowered due to the frozen water, the disadvantages are compensated by supplying the oxygen-containing gas and the fuel gas at the high pressures and flow rates. Consequently, it is possible to operate the fuel cell desirably even if the load of the fuel cell is high in the freezing environment. Since the fuel cell is operated for the high load, the heat energy generated in the fuel cell is high, and the heat energy is used for warming up the fuel cell, raising the temperature of the fuel cell above the freezing temperature rapidly.

Since the gas pressures are high, power consumption of auxiliary devices is large, the load on the fuel cell is increased by the large power consumption of the auxiliary devices. Thus, the fuel cell produces a rather large heat energy, which speeds up the warming up operation. Further, it is possible to raise the temperature of the fuel cell above the freezing temperature in a short period of time, and start up the operation of the fuel cell in the freezing environment efficiently.

At the cathode, the flow rate of the oxygen-containing gas is large in comparison with the flow rate of the oxygen-containing gas in the normal starting up operation. At the cathode, water is produced by the reaction. The water is discharged to the outside efficiently by the oxygen-containing gas at the high flow rate. Thus, it is possible to prevent the gas diffusion characteristics from being lowered significantly due to the frozen water.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a view showing a low temperature starting up operation according to a method disclosed in Japanese laid-open patent publication No. 2000-512068.

DESCRIPTION OF THE PREFERRED EMBODIMENTS

Figure 3:
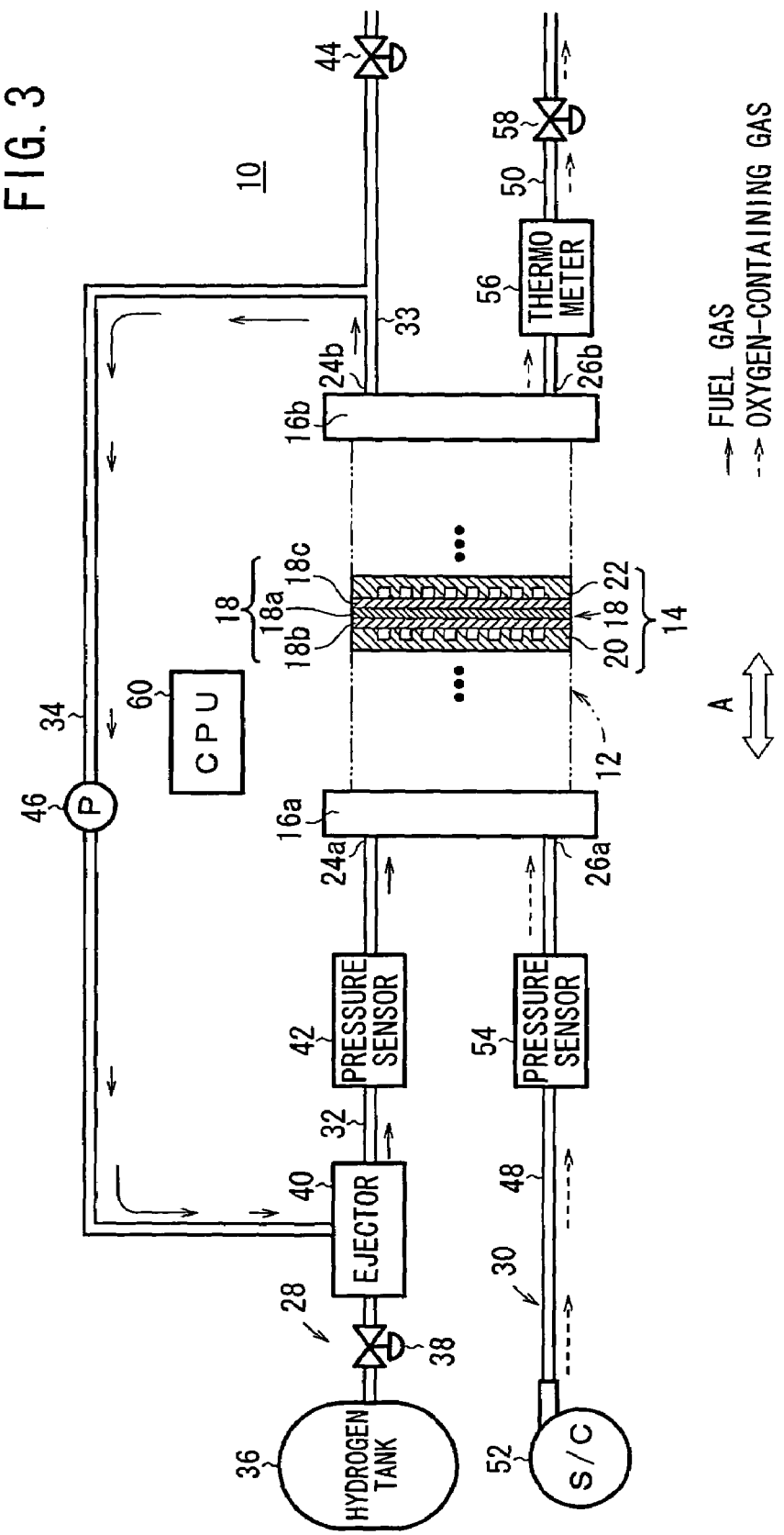
FIG. 3 is a view schematically showing a fuel cell system for carrying out a method of starting up operation of a fuel cell at a low temperature according to an embodiment of the present invention.

FIG. 3 is a view schematically showing a fuel cell system 10 for carrying out a method for starting up operation of a fuel cell at a low temperature according to an embodiment of the present invention.

The fuel cell system 10 is mounted in a vehicle such as a car, and includes a fuel cell stack 12. The fuel cell stack 12 is formed by stacking a plurality of power generation cells (fuel cells) 14 in a direction indicated by an arrow A. End plates 16a, 16b are provided at opposite ends in the stacking direction. The end plates 16a, 16b, are tightened together by tightening bolts (not shown) in the stacking direction.

For example, each of the power generation cells 14 includes a membrane electrode assembly (electrolyte electrode assembly) 18 and a pair of separators 20, 22 sandwiching the membrane electrode assembly 18. The membrane electrode assembly 18 includes an anode 18b, a cathode 18c, and a solid polymer electrolyte membrane 18a interposed between the anode 18b and the cathode 18c. A fuel gas such as a hydrogen-containing gas is supplied to the anode 18b, and an oxygen-containing gas such as the air is supplied to the cathode 18c.

The end plate 16a has a hydrogen supply port 24a and an air supply port 26a. The hydrogen gas is supplied to the power generation cells 14 through the hydrogen supply port 24a, and the air is supplied to the power generation cells 14 through the air supply port 26a. The end plate 16b has a hydrogen discharge port 24b and an air discharge port 26b. After the hydrogen in the hydrogen gas is partially consumed in the power generation cells 14, the hydrogen gas containing the unconsumed hydrogen is discharged as an exhaust gas from the power generation cells 14 through the hydrogen discharge port 24b. Likewise, after the oxygen in the air is partially consumed in the power generation cells 14, the air containing the unconsumed oxygen is discharged from the power generation cells 14 through the air discharge port 26b.

The fuel cell system 10 includes a fuel gas supply system 28, an oxygen-containing gas supply system 30, and a coolant supply system (not shown). The fuel gas supply system 28 includes a hydrogen supply passage 32 for supplying the hydrogen gas to the fuel cell stack 12, a hydrogen discharge passage 33 for discharging the exhaust gas containing the unconsumed hydrogen, and a hydrogen circulation passage 34 for circulating the exhaust gas back to the middle of the hydrogen supply passage 32 so that the unconsumed hydrogen in the exhaust gas can be supplied to the fuel cell stack 12 again.

A hydrogen tank 36, a regulator 38, an ejector 40, and a pressure sensor 42 are provided in the hydrogen supply passage 32. The hydrogen tank 36 stores a high pressure hydrogen. The regulator 38 reduces the pressure of the hydrogen gas supplied from the hydrogen tank 36. The ejector 40 supplies the hydrogen gas at the reduced pressure to the fuel cell stack 12, and sucks the exhaust gas from the hydrogen circulation passage 34 for circulating the exhaust gas back to the fuel cell stack 12. The pressure sensor 42 detects the pressure of the hydrogen gas supplied to the fuel cell stack 12.

A purge valve 44 for discharging the exhaust gas from the fuel cell stack 12 to the outside is provided in the hydrogen discharge passage 33, and a pump 46 for regulating the flow rate of the hydrogen gas supplied to the fuel cell stack 12 is provided in the hydrogen circulation passage 34.

The oxygen-containing gas supply system 30 includes an air supply passage 48 for supplying the air to the fuel cell stack 12, and an air discharge passage 50 for discharging the exhaust gas containing the unconsumed oxygen to the outside.

A supercharger (compressor) 52 for compressing the air supplied to the fuel cell stack 12, and a pressure sensor 54 for detecting the pressure of the air supplied to the fuel cell stack 12 are provided in the air supply passage 48. A thermometer 56 for detecting the temperature at an air outlet of the fuel cell stack 12, and a pressure regulator valve 58 for regulating the pressure of the air supplied to the fuel cell stack 12 are provided in the air discharge passage 50.

Figure 4:
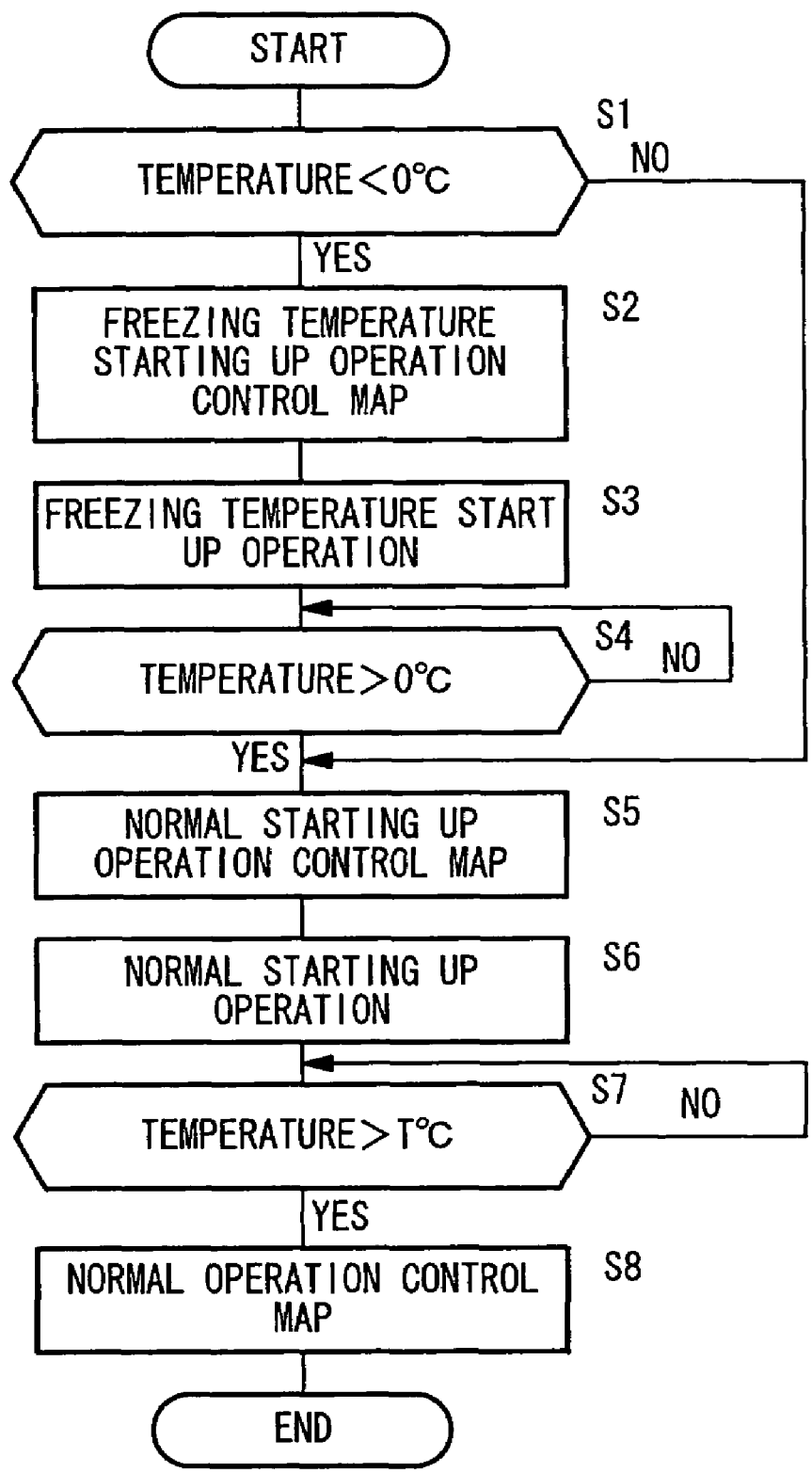
FIG. 4 is a flowchart showing the low temperature starting up operation method.

Next, operation of the fuel cell system 10 will be described with reference to a flowchart shown in FIG. 4.

The fuel cell system 10 is operated under the control of a CPU (central processing unit) 60. Firstly, when a drive signal is inputted to the CPU 60, operation of the fuel cell system 10 is started, and the temperature at the air outlet of the fuel cell stack 12 is detected by the thermometer 56 (step S1). If it is determined that the environmental temperature is the freezing temperature of water or less (0° C. or less) based on the detected temperature (YES in step S1), control passes to step S2 to enter an operation mode using a freezing temperature starting up operation control map.

Instead of detecting the temperature at the air outlet of the fuel cell stack 12, the temperature at the coolant outlet of the fuel cell stack 12 may be detected. Alternatively, a thermocouple is attached to the membrane electrode assembly 18 to directly detect the temperature of the membrane electrode assembly 18.

Figure 1:
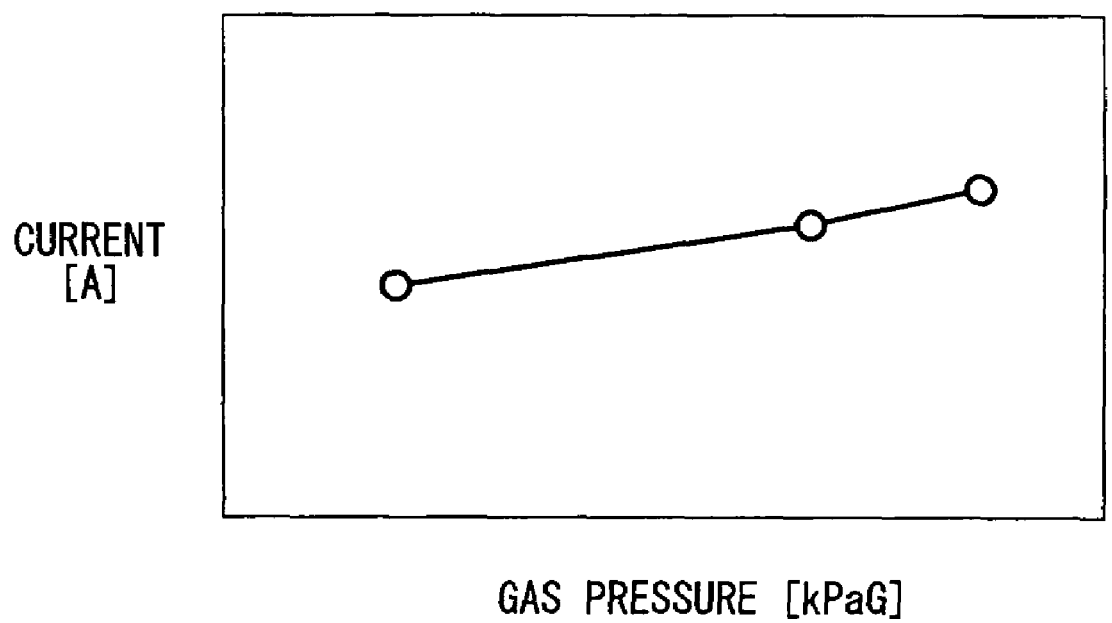
FIG. 1 is a graph showing relationship between the output current and the gas pressure when a fuel cell stack is operated in a freezing environment, i.e., at the freezing temperature of water or less.
Figure 2:
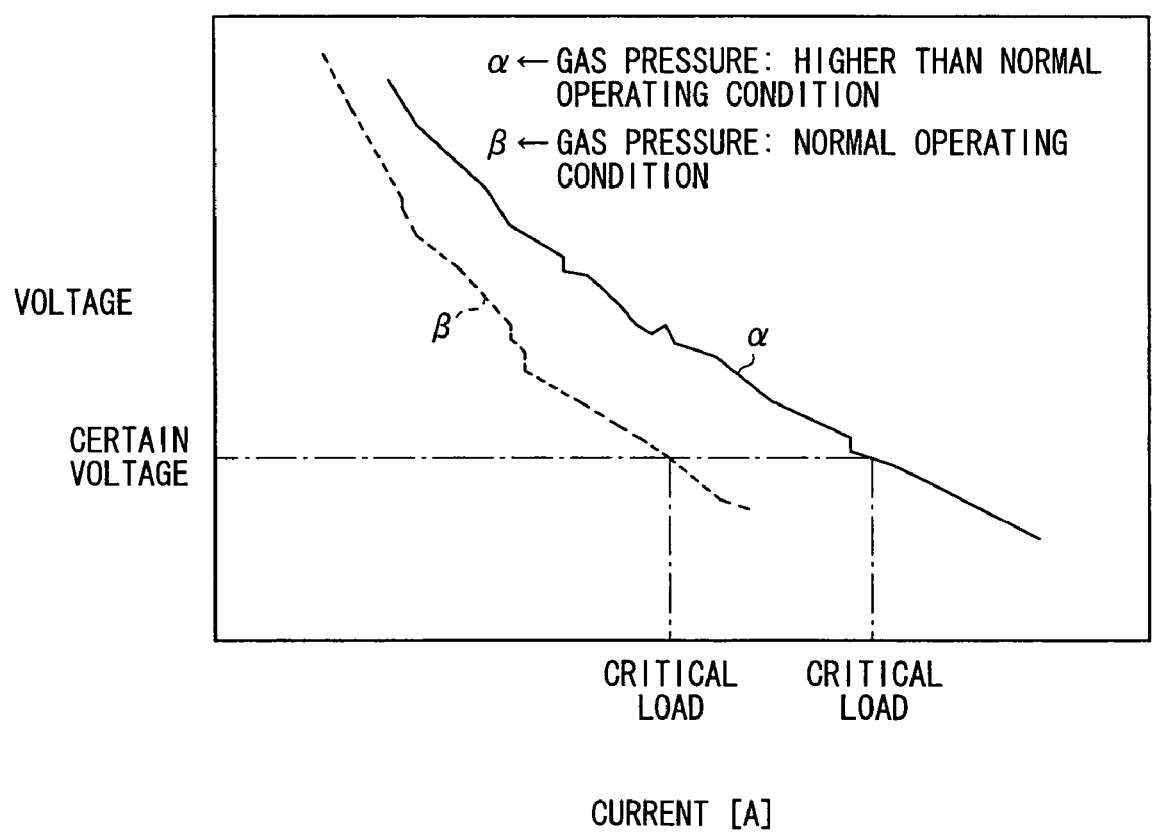
FIG. 2 is a graph showing relationship between the voltage and the critical load (current) when the fuel cell stack is operated at a high gas pressure and at a low gas pressure in the freezing environment.
Figure 5:
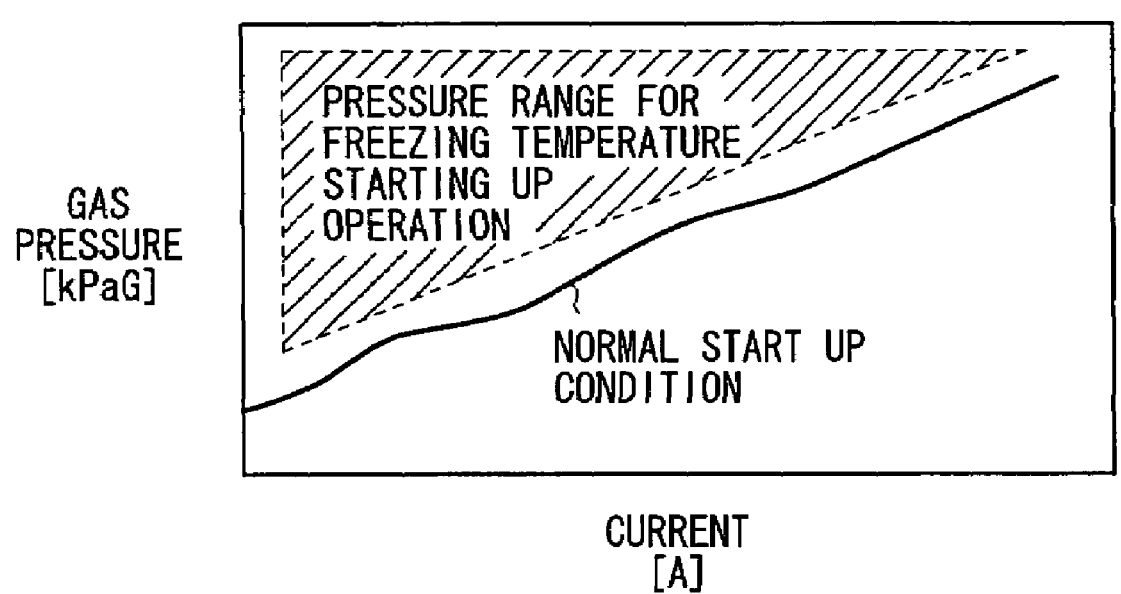
FIG. 5 is a view showing a gas pressure control map.

The freezing temperature starting up operation control map includes a pressure control map for controlling pressures of the fuel gas and the oxygen-containing gas, and a flow rate control map for controlling flow rates of the fuel gas and the oxygen-containing gas. As shown in FIG. 5, according to the pressure control map, the gas pressures in the operation mode using the freezing temperature starting up operation control map are high in contrast to the gas pressures according to a normal starting up operating condition, i.e., in an operation mode using a normal temperature starting up operation control map when the fuel cell system 10 is operated above the freezing temperature (above 0° C.). As shown in FIG. 1, the current value increases in proportional to the gas pressure value in the freezing environment, i.e., at the freezing temperature of water or less. Therefore, when the fuel cell system 10 is operated in the freezing environment (0° C. or less), the gas pressures need to be as high as possible since the load of the fuel cell system 10 is significantly high.

The upper limit of the gas pressures are determined by the maximum gas pressures (critical operating gas pressures) according to the normal operating condition of the fuel cell stack 12, and subject to the specification of the auxiliary devices such as the supercharger 52. According to the flow rate control map, as long as the flow rate of the oxygen-containing gas is high, the flow rate of the fuel gas may not be high.

Thus, when the fuel cell stack 12 is in the freezing environment, the fuel cell stack 12 is started up according to the operating condition of the freezing temperature starting up operation control map (step S3). Specifically, as shown in FIG. 3, the pressure of the hydrogen gas supplied to the hydrogen supply passage 32 is regulated at a predetermined temperature by the regulator 38. Then, the hydrogen gas is supplied to hydrogen supply port 24a of the fuel cell stack 12.

The hydrogen gas supplied to the hydrogen supply port 24a moves along the anode 18b in each of the power generation cells 14 for inducing an electrochemical reaction at the anode 18b. The exhaust gas containing the unconsumed hydrogen is discharged from the hydrogen discharge port 24b into the hydrogen discharge passage 33, and flows into the hydrogen circulation passage 34. The exhaust gas containing the unconsumed hydrogen is circulated back to the middle of the hydrogen supply passage 32 by the sucking action of the ejector 40, and supplied again as the fuel gas into the fuel cell stack 12. Since the warm exhaust gas is circulated, the heat energy of the exhaust gas is advantageously used in starting up the operation of the fuel cell stack 12.

The air is supplied to the air supply passage 48 by the supercharger 52. The air is supplied from the air supply port 26a to the cathode 18c in each of the power generation cells 14 for inducing an electrochemical reaction at the cathode 18c. The air containing the unconsumed oxygen is discharged as the exhaust gas from the air discharge port 26b to the air discharge passage 50.

Thus, in each of the power generation cells 14, the hydrogen gas supplied to the anode 18b, and the oxygen-containing gas supplied to the cathode 18c are consumed in the electrochemical at the anode 18b and the cathode 18c for generating electricity.

During power generation in the fuel cell stack 12, in the fuel gas supply system 28, the pressure of the hydrogen gas is regulated by the regulator 38 at the predetermined pressure, and the flow rate of the hydrogen gas is regulated at the predetermined flow rate by the pump 46 provided in the hydrogen circulation passage 34. When the fuel cell system 10 is operated in the freezing environment, the hydrogen gas supplied to the fuel cell stack 12 is regulated at the higher pressure and the higher flow rate in comparison with the pressure and the flow rate in the normal starting up operating condition.

In the oxygen-containing gas supply system 30, the pressure of the oxygen-containing gas supplied to the fuel cell stack 12 is regulated by the pressure regulator valve 58 at the predetermined pressure, and the flow rate of the oxygen-containing gas is regulated at the predetermined flow rate by controlling the rotational speed of the supercharger 52. Thus, when the fuel cell system 10 is operated in the freezing environment, the oxygen-containing gas supplied to the fuel cell stack 12 is regulated at the higher pressure and the higher flow rate in comparison with the normal starting up operating condition.

As described above, when the fuel cell system 10 is operated in the freezing environment, the fuel gas and the oxygen-containing gas are supplied to the fuel cell stack 12 at the higher pressures and higher flow rates in comparison with the pressures and the flow rates in the normal starting up operating condition. Thus, even if the catalyst does not function effectively in the freezing environment, and the gas diffusion characteristics are lowered due to the frozen water, the disadvantages are compensated by supplying the oxygen-containing gas and the fuel gas at the high pressures and flow rates. Consequently, it is possible to operate the fuel cell system 10 desirably even if the load of the fuel cell system 10 is high in the freezing environment. Since the fuel cell system 10 is operated for the high load, the heat energy generated in each of the power generation cells 14 is high, and the heat energy is used for warming up the power generation cells 14, raising the temperature of the power generation cells 14 above the freezing temperature rapidly.

Since the gas pressures are high, power consumption of auxiliary devices such as the supercharger 52 is large, the load on the fuel cell stack 12 is increased by the large power consumption of the auxiliary devices. Thus, the fuel cell stack 12 produces a rather large heat energy, which speeds up the warming up operation. Furthermore, the temperatures of the fuel gas and the oxygen-containing gas increase by the effect of adiabatic compression. Accordingly, it is possible to start up the operation of the fuel cell system 10 in the freezing environment efficiently, and raise the temperature of the fuel cell stack 12 above the freezing temperature in a short period of time.

At the cathode 18c, the flow rate of the oxygen-containing gas is large in comparison with the flow rate of the oxygen-containing gas in the normal starting up operation. At the cathode 18c, water is produced by the reaction. The water is discharged to the outside efficiently by the oxygen-containing gas at the high flow rate. Thus, it is possible to prevent the gas diffusion characteristics from being lowered significantly due to the frozen water.

Figure 6:
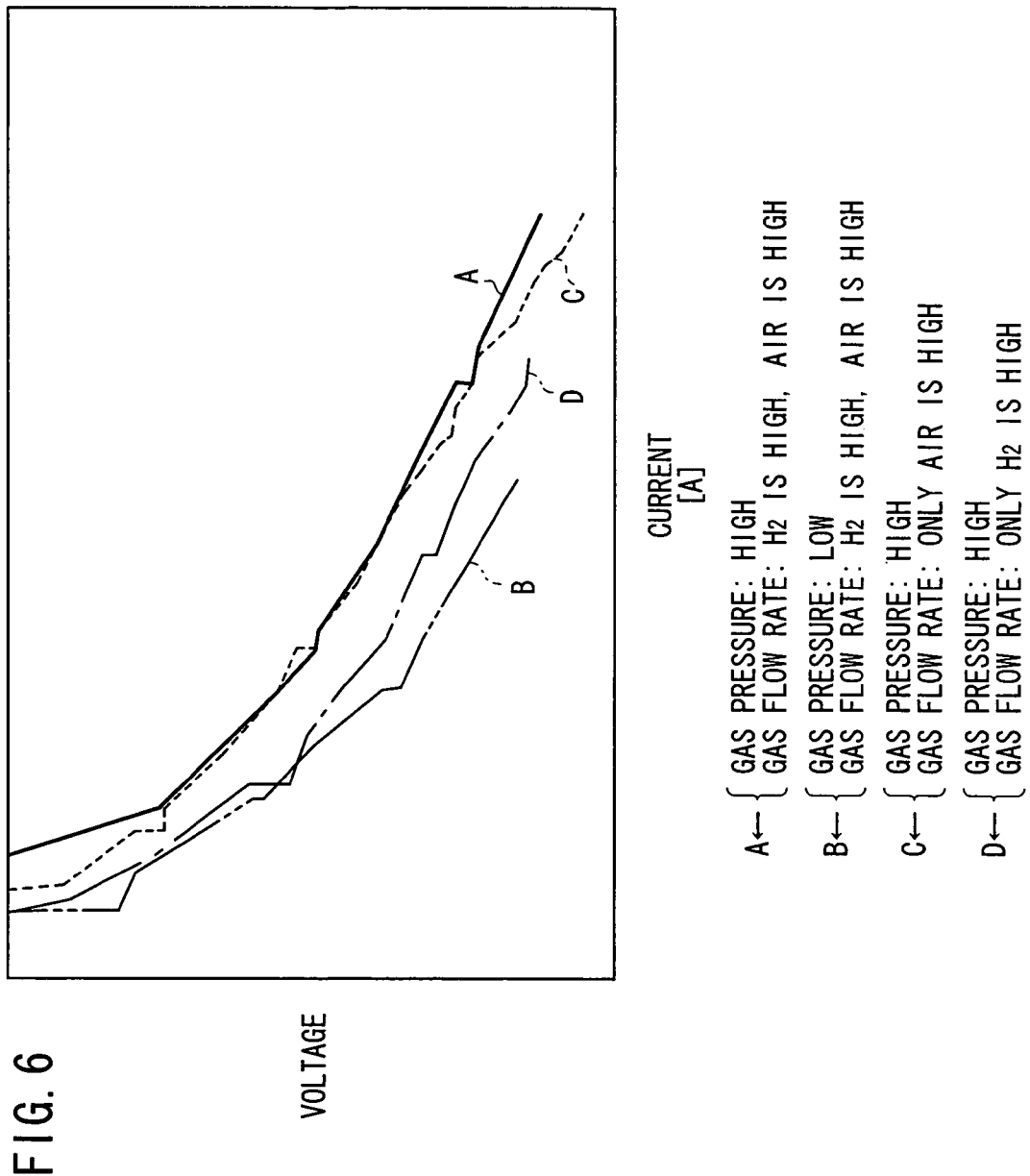
FIG. 6 is a view showing relationship between the output current and the voltage when the gas pressures and the gas flow rates are high or low.

FIG. 6 shows relationship between the output current and the output voltage. Lines A to D shows cases (combinations) when the gas pressures and the gas flow rates of the fuel gas and the oxygen-containing gas are high or low. As shown in FIG. 6, when the gas pressures of the oxygen-containing gas and the fuel gas are low, even if the flow rates of the oxygen-containing gas and the fuel gas are high, the output current is small (see line B).

In contrast, when the gas pressures of the oxygen-containing gas and the fuel gas are high, the output current is relatively large even if only one of the flow rates of the oxygen-containing gas and the fuel gas is high (see lines C and D). In particular, when the flow rate of the oxygen-containing gas is high, the output current is considerably large. Thus, it is possible to start up the operation of the fuel cell stack 12 efficiently in the freezing environment (see line C).

Then, when it is detected that the temperature of the fuel cell stack 12 exceeds the freezing temperature (above 0° C.) (YES, in step S4), the control passes to step S5 to enter the operation mode using the normal starting up operation control map. According to the normal starting up operation control map, the pressures and the flow rates of the fuel gas and oxygen-containing gas are low in comparison with the pressures and the flow rates in the operation mode in the freezing environment.

When the pressures of the oxygen-containing gas and the flow rates are lowered, the volumes of the fuel gas and the oxygen-containing gas are increased, and thus, the fuel gas and the oxygen-containing gas flow through the fuel gas flow field and the oxygen-containing gas flow field (not shown) at a high speed. Accordingly, flooding in the fuel gas flow field and the oxygen-containing gas flow field can be prevented.

In this manner, the gas pressures and the gas flow rates are lowered to decrease the load on the fuel cell stack 12. Accordingly, the overall power generation efficiency in the fuel cell system 10 is improved, and the normal starting up operation of the fuel cell stack 12 is carried out economically (step S6).

When the temperature of the fuel cell stack 12 is raised above a predetermined temperature T° C. after the normal starting up operation is continuously carried out (YES in step S7), the control passes to step S8 to enter the normal operation mode using the normal operation control map. In this manner, low temperature starting up operation of the fuel cell stack 12 is finished, and the fuel cell stack 12 is operated in the normal operation mode.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method of starting a fuel cell at a freezing temperature of water or less, said fuel cell including an electrolyte electrode assembly, and separators sandwiching said electrolyte electrode assembly, said electrolyte electrode assembly including a pair of electrodes, and an electrolyte interposed between said electrodes, said method comprising the steps of:

providing a freezing temperature operation control map, the freezing temperature operation control map including a first pressure control map for controlling pressures of a fuel gas and an oxygen-containing gas supplied to the fuel cell, and a first flow rate control map for controlling at least a flow rate of the oxygen-containing gas supplied to the fuel cell, the first pressure control map defining a relationship between the pressures of the fuel gas and the oxygen-containing gas and an output current of the fuel cell at the freezing temperature of water or less, the output current of the fuel cell increasing proportionally as the pressures of the fuel gas and the oxygen-containing gas increase in the first pressure control map, providing a normal operation control map, the normal operation control map including a second pressure control map for controlling pressures of the fuel gas and the oxygen-containing gas supplied to the fuel cell, and a second flow rate control map for controlling at least the flow rate of the oxygen-containing gas supplied to the fuel cell, the second pressure control map defining a relationship between the pressures of the fuel gas and the oxygen-containing gas and the output current of the fuel cell at a temperature higher than the freezing temperature of water, the output current of the fuel cell increasing proportionally as the pressures of the fuel gas and the oxygen-containing gas increase in the second pressure control map, wherein a first gas pressure according to the first pressure control map causes the fuel cell to generate a first level of the output current at the freezing temperature of water or less, and a second gas pressure according to the second pressure control map causes the fuel cell to generate a second level of the output current at the temperature higher than the freezing temperature of water, and the first gas pressure is greater than the second gas pressure when the first level of the output current equals the second level of the output current;

selecting a first operation in which the fuel cell is controlled using the freezing temperature operation control map when it is detected that the temperature of said fuel cell is the freezing temperature of water or less, performing the first operation of said fuel cell using the pressures of the fuel gas and the oxygen-containing gas and the flow rate of the oxygen-containing gas determined from said freezing temperature operation control map to generate a required output current of the fuel cell, wherein the generated output current of the fuel cell is provided to an external circuit in the first operation; and switching from said first operation to a second operation in which the fuel cell is controlled using the normal operation control map when it is detected that temperature of said fuel cell exceeds said freezing temperature of water.

2. A method according to claim 1, wherein gas flow rates according to said freezing temperature operation control map are higher than gas flow rates according to said normal operation control map.

3. A method according to claim 1, wherein said oxygen-containing gas is compressed by a compressor, and said compressor is driven by electricity generated by said fuel cell.

4. A method according to claim 1, wherein said fuel gas is discharged from said fuel cell after consumption, and supplied again to said fuel cell by circulation.

5. A method according to claim 1, wherein said fuel gas discharged from said fuel cell is supplied again to said fuel cell by a pump provided in a circulation passage.

6. A method according to claim 1, wherein the temperature of said fuel cell is detected by a thermometer provided in an oxygen-containing gas discharge passage.

7. A method according to claim 1, wherein the step of performing the first operation comprises the steps of:

supplying the fuel gas only to an anode electrode at the freezing temperature of water or less; and supplying the oxygen-containing gas only to a cathode electrode at the freezing temperature of water or less.

* * * * *

UNITED STATES PATENT AND TRADEMARK OFFICE
CERTIFICATE OF CORRECTION

PATENT NO. : 7,588,844 B2 Page 1 of 1
APPLICATION NO. : 10/887709
DATED : September 15, 2009
INVENTOR(S) : Hayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 128 days.

Signed and Sealed this

Twenty-first Day of September, 2010

David J. Kappos
*Director of the United States Patent and Trademark Office*